United States Patent
Bonanni

(10) Patent No.: US 11,155,268 B2
(45) Date of Patent: Oct. 26, 2021

(54) UTILIZING PASSENGER ATTENTION DATA CAPTURED IN VEHICLES FOR LOCALIZATION AND LOCATION-BASED SERVICES

(71) Applicant: Motional AD LLC, Boston, MA (US)

(72) Inventor: Taigo Maria Bonanni, Singapore (SG)

(73) Assignee: MOTIONAL AD LLC, Boston, MA (US)

( * ) Notice: Subject to any disclaimer, the term of this patent is extended or adjusted under 35 U.S.C. 154(b) by 0 days.

(21) Appl. No.: 16/743,983

(22) Filed: Jan. 15, 2020

(65) Prior Publication Data

US 2020/0223444 A1 Jul. 16, 2020

Related U.S. Application Data

(60) Provisional application No. 62/792,869, filed on Jan. 15, 2019.

(51) Int. Cl.
*B60W 40/08* (2012.01)
*G06K 9/00* (2006.01)
(Continued)

(52) U.S. Cl.
CPC ......... *B60W 40/08* (2013.01); *G06K 9/00845* (2013.01); *G06Q 30/0266* (2013.01); *G06T 19/006* (2013.01); *B60W 2040/089* (2013.01); *B60W 2540/01* (2020.02); *B60W 2540/21* (2020.02); *B60W 2540/229* (2020.02)

(58) Field of Classification Search
CPC ............ B60W 40/08; B60W 2540/01; B60W 2540/21; B60W 2540/229; B60W 2040/089; G06K 9/00845; G06Q 30/0266; G06T 19/006
See application file for complete search history.

(56) References Cited

U.S. PATENT DOCUMENTS 10,242,457 B1 * 3/2019 Sibley .................. G09G 3/003
2015/0006278 A1 1/2015 Di Censo et al.
(Continued)

OTHER PUBLICATIONS

[No Author Listed], "J3016: Taxonomy and Definitions for Terms Related to on-Road Motor Vehicle Automated Driving Systems" SAE International, Sep. 2016, 30 pages.
(Continued)

*Primary Examiner* — Thomas D Alunkal
(74) *Attorney, Agent, or Firm* — Fish & Richardson P.C.

(57) ABSTRACT

Techniques are disclosed for utilizing passenger attention data captured in vehicles for vehicle localization and location-based services. In an embodiment, a method includes receiving sensor data from one or more sensors of an autonomous vehicle operating in an environment, and generating passenger attention data for a passenger of the autonomous vehicle using the sensor data. A processing circuit determines one or more physical features in the environment based on the passenger attention data. The processing circuit obtains physical feature data associated with the physical feature(s) and initiates one or more actions on the AV based at least in part on the physical feature data. The actions include but are not limited to requesting content for physical features(s) and assisting in localization of the autonomous vehicle.

22 Claims, 16 Drawing Sheets

(51) Int. Cl.
*G06Q 30/02* (2012.01)
*G06T 19/00* (2011.01)

(56) References Cited

U.S. PATENT DOCUMENTS

| | | | |
|---|---|---|---|
| 2016/0018889 A1 | 1/2016 | Skogo | |
| 2017/0008521 A1* | 1/2017 | Braunstein | G08G 1/167 |
| 2017/0161949 A1* | 6/2017 | Seder | B60R 1/001 |
| 2018/0040162 A1* | 2/2018 | Donnelly | G05D 1/0246 |
| 2018/0040163 A1* | 2/2018 | Donnelly | G06F 3/017 |
| 2018/0211117 A1* | 7/2018 | Ratti | G06K 9/00785 |
| 2019/0017839 A1* | 1/2019 | Eyler | G02B 27/0101 |
| 2020/0001890 A1* | 1/2020 | Kline | B60W 50/14 |
| 2020/0104522 A1* | 4/2020 | Collart | G06Q 50/184 |
| 2020/0183383 A1* | 6/2020 | Stent | G05D 1/0061 |

OTHER PUBLICATIONS

Betke et al., "Mobile Robot Localization Using Landmarks," IEEE Transactions on Robotics and Automation, May 1997, 13(2):251-263.

PCT International Search Report and Written Opinion in International Appln. No. PCT/IB2020/050313, dated Apr. 23, 2020, 11 pages.

* cited by examiner

UTILIZING PASSENGER ATTENTION DATA CAPTURED IN VEHICLES FOR LOCALIZATION AND LOCATION-BASED SERVICES

PRIORITY

This application claims priority to and the benefit of U.S. application Ser. No. 62/792,869, filed on Jan. 15, 2019, the contents of which is incorporated here by reference in its entirety.

FIELD OF THE INVENTION

This description relates to vehicle localization and location-based services, and more particularly to utilizing passenger attention data captured in vehicles for localization and location-based services.

BACKGROUND

Automotive platforms for analyzing driver eye gaze direction and head/torso pose have been developed to predict a driver's intent to turn and change lanes. These platforms use state-of-the-art vision-based head/torso pose algorithms that are automatic, fast and person invariant. A commonly used approach to measure a driver's head/torso pose uses multiple cameras and either knowledge-based three-dimensional models that are projected and fitted on an image or machine learning with neural networks. Accordingly, these current state-of-the-art algorithms can determine the attention of one or more passengers in an autonomous vehicle.

SUMMARY

Techniques are disclosed for utilizing passenger attention data captured in vehicles for vehicle localization and location-based services. In an embodiment, a method includes receiving sensor data from one or more sensors of an autonomous vehicle operating in an environment and using the sensor data to generate passenger attention data for one or more passengers of the autonomous vehicle. A processing circuit determines one or more physical features in the environment based on the passenger attention data. The processing circuit obtains physical feature data for the one or more physical features and initiates one or more actions based at least in part on the physical feature data.

In an embodiment, an action includes using a localization circuit of the autonomous vehicle to localize the autonomous vehicle based at least in part on the physical feature data.

In an embodiment, an action includes obtaining passenger preference data, selecting content (e.g., an advertisement, personalized video or slideshow presentation, audio presentation, virtual reality or augmented reality themed representations) associated with the physical feature data and the passenger preference data, and sending the content to the autonomous vehicle for playback on an output device of the autonomous vehicle or a passenger mobile device.

In an embodiment where the autonomous vehicle includes two or more passengers, the processing circuit receives first passenger preference data from a first passenger in the autonomous vehicle and second passenger preference data from a second passenger of the autonomous vehicle. The processing circuit selects content related to the physical feature based on the first and second passenger preference data, and sends the content to the autonomous vehicle and/or a passenger mobile device in the autonomous vehicle.

In an embodiment, the processing circuit determines seat locations of passengers in the autonomous vehicle, and filters the passenger attention data based on the seat locations.

In an embodiment, the passenger attention data includes audio samples of commentary or utterances made by the passenger in the autonomous vehicle that is indicative of the physical feature.

In an embodiment, determining the physical feature and obtaining the physical feature data includes determining a location of the autonomous vehicle in the environment using a localization circuit of the autonomous vehicle. Passenger eye gaze and/or head/torso pose is captured by a sensor and used to construct a line-of-sight (LOS) vector from the passenger's seat position in the autonomous vehicle to the physical feature, and the processing circuit determines the physical feature using the LOS vector and a two-dimensional (2D) or three-dimensional (3D) map or 3D building model of the environment.

In an embodiment, the processing circuit generates or obtains content related to the physical feature data and then augments a 2D or 3D digital map or 3D building model of the environment with the content. In an embodiment, the content is virtual tour media (generic or personalized) that includes at least a portion of the physical feature data.

In an embodiment, the processing circuit determines an attention time span of the passenger based on the passenger attention data and filters the passenger attention data based on the attention time span.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
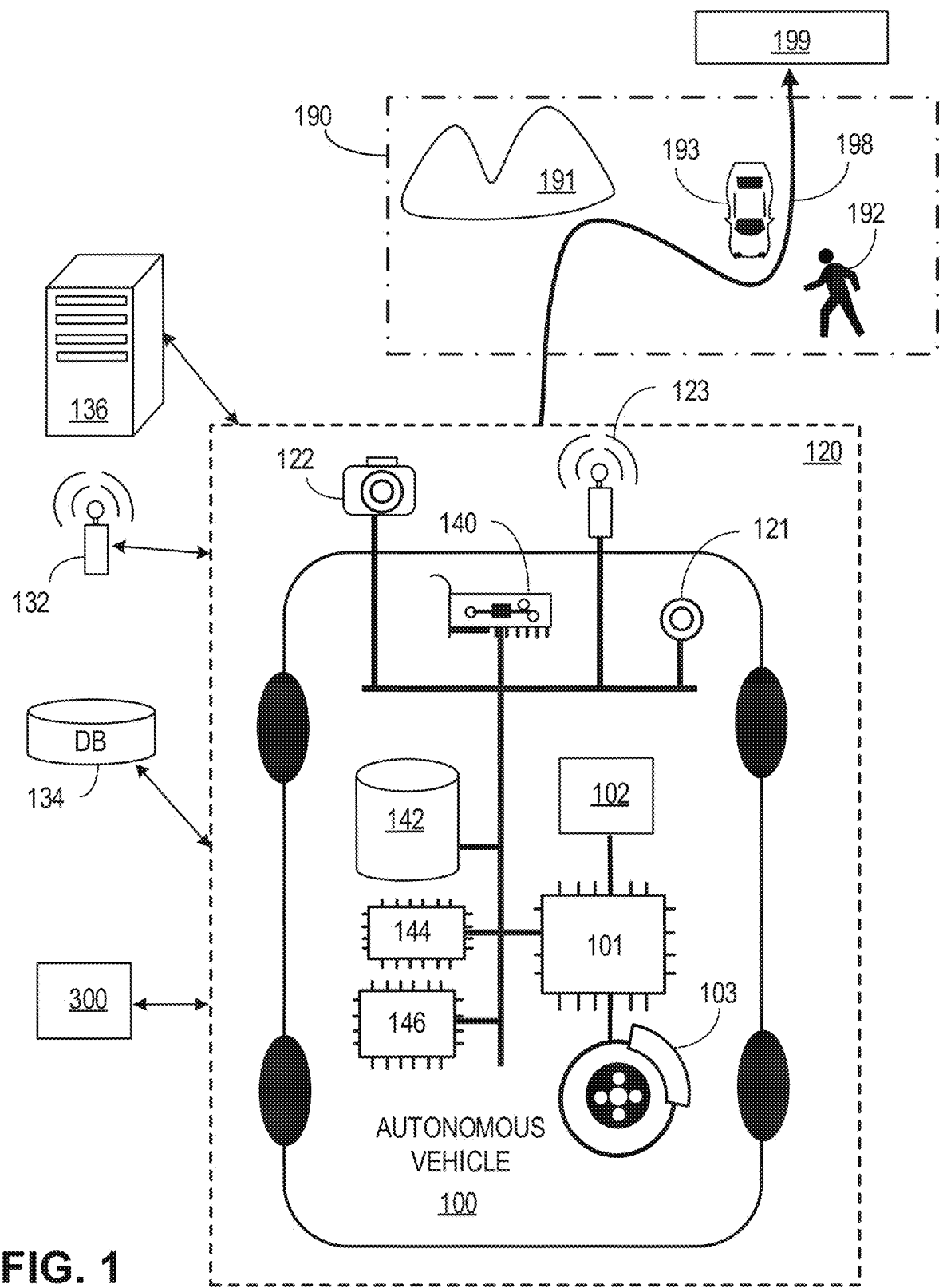
FIG. 1 shows an example of an autonomous vehicle having autonomous capability, in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
 2. System Overview
 3. Autonomous Vehicle Architecture
 4. Autonomous Vehicle Inputs
 5. Autonomous Vehicle Planning
 6. Autonomous Vehicle Control
 7. Content Deliver Using Passenger Attention Data
 8. Localization Using Passenger Attention Data General Overview A benefit of fully autonomous vehicles is that a passenger is not burdened with the tasks of driving and can shift their attention to the broader environment to discover information and enjoy their surroundings. Moreover, state-of-the-art vision-based eye gaze and head/torso pose algorithms have been developed that determine a passenger's eye gaze direction or head/torso pose using multiple cameras and knowledge-based 3D models projected and fitted on a camera image or machine learning using neural networks.

Passenger attention detection technology has been successfully used in manually driven vehicles to determine whether a driver is alert or drowsy for the purpose of providing an alert to waken the driver and avoid an accident. The technology is also used to determine whether a passenger in a fully autonomous vehicle is in a suitable state to manually drive the AV in the event fully automated driving is no longer possible (e.g., sensor failures). In the description that follows, passenger attention data is used to generate or select location-based content to deliver to the passengers of an autonomous vehicle. Passenger attention data is also used to identify landmarks and other physical features for assisting in localization of the autonomous vehicle.

In an embodiment, sensors (e.g., 3D image sensors, time-of-flight (TOF) sensors, microphones) placed in a passenger compartment of an autonomous vehicle are used to capture passenger attention data for one or more passengers of the autonomous vehicle. The passenger attention data (e.g., head/torso pose, eye gaze direction, audio samples of passenger commentary/utterances) indicates a physical feature of the environment that has attracted the attention of the one or more passengers (e.g., a landmark, scenic view) riding in the autonomous vehicle. The passenger attention data is used to initiate one or more actions on the autonomous vehicle, such as assisting in autonomous vehicle localization or requesting delivery of content (e.g., a video, slideshow, advertisement) related to a physical feature data to an autonomous vehicle output device and/or a passenger's personal device (e.g., smartphone, tablet computer, wearable device).

In an embodiment, passenger attention data includes but is not limited to tracking the head/torso pose (head orientation) of one or more passengers in the autonomous vehicle. For example, the head/torso pose angle can be measured relative to a local reference coordinate system attached to the autonomous vehicle and used to construct a passenger LOS vector that extends from the passenger's seated position in the vehicle and in the direction of the physical feature. The passenger LOS vector can be used with a 2D or 3D digital map and/or 3D building model to construct a viewing frustum around the LOS vector, referred to as a passenger field-of-view (PFOV).

In an embodiment, the passenger LOS vector and the location of the autonomous vehicle (hereinafter referred to as "PFOV data") are sent to a network-based computing platform where the PFOV data is used with a 2D/3D digital map and/or 3D building model to determine the physical features in the environment that fall are within the PFOV (e.g., landmarks, buildings, monuments, natural structures). In an alternative embodiment, a computer system (e.g., computer system 300) of the autonomous vehicle uses a local digital map and/or building model to determine the physical features within the PFOV.

In an embodiment, PFOV data is filtered to remove outlier passenger attention data and added to a database of crowd-sourced PFOV data stored on the network-based computing platform. The crowd-sourced PFOV data is used to determine which physical feature of a plurality of physical features in the PFOV is most likely attracting the attention of the passenger. For example, a list of physical features determined to be in the PFOV and their descriptions (e.g., names, images) are sent to the autonomous vehicle where the descriptions are displayed on an output device (e.g., a display) of the autonomous vehicle and/or a personal device of a passenger (e.g., smart phone, tablet computer, wearable device). The passenger is asked to confirm that they see the physical features that are described by manipulating an affordance (e.g., a check box or button) on a graphical user interface (GUI). The passenger is also asked to indicate through a GUI affordance which physical feature(s) they would like to receive content for (hereinafter the "principal feature of interest" or "PFOI").

The passenger's response is sent back to the network-based computing platform where it is added to the crowd-sourced PFOV data. Based on the received passenger response, a content database is used to generate or select content to be delivered to the passenger related to the PFOI. For example, PFOI content is aggregated into a custom video or slideshow for the PFOI. In an embodiment, the content database is a map database with overlaid points-of-interest (POIs) that have been annotated by business owners, government entities, travel agents and/or the general public (e.g., Google® Maps, Yelp®). In an embodiment, the PFOI is used to make recommendations to passengers for content (e.g., based on popularity) and to allow advertisers to better target advertisements to passengers in the vehicle.

In an embodiment, the PFOV data is used together with other information to generate or select content for delivery to the passenger. For example, the season, weather conditions (e.g., from a wireless weather forecast service), the time of day, user preferences and demographics (e.g., provided by the passenger after opt-in), passenger musical tastes (e.g., derived from the vehicle's infotainment system), the departure and destination locations and chosen route (e.g., provided by the navigation system), and any other information that is available or derived to generate and/or select targeted content for passengers.

In an embodiment, PFOV data includes recorded audio of passenger conversations in the passenger compartment, such as passenger commentary or utterances related to a physical feature that can be used as a cue to determine which physical feature has attracted the passenger's interest at the current location of the autonomous vehicle. In an embodiment, passengers are asked to "opt-in" verbally through a microphone or through a touch display before being recorded to safeguard their privacy.

In an embodiment, where there are multiple physical features in a PFOV, the identified physical features are filtered according to the passenger's previously specified or learned preferences. For example, if the passenger profile indicates a preference for content related to historical landmarks than the passenger is provided a list of historical landmarks from which to request content. The physical features of the environment can include but are not limited to: landmarks, buildings, natural geographic sites, scenic lookouts, restaurants, rest stops, or anything else that can attract a passenger's attention. In an implementation, the physical feature is temporary, such as a traffic accident, road conditions (e.g., large pot holes), damaged roadway infrastructure (e.g., signs, traffic lights, bridges) that can be identified from PFOV data and verified by the passenger. In an embodiment, the verified PFOV is used to alert first responders or other government services of the accident.

In an embodiment, content sent to passengers is presented on or played through a suitable output device in the autonomous vehicle. For example, the autonomous vehicle displays the content on a heads-up display, on a screen (e.g., a touchscreen) or play the content through loudspeakers in the autonomous vehicle. The content can also send be sent to a passenger mobile device (e.g., a smartphone, tablet computer, wearable device) through a mobile Wi-Fi router in the autonomous vehicle or through a cellular network connection.

In an embodiment where there are two or more passengers in the autonomous vehicle, first passenger preference data is obtained for each passenger. Separate content is generated or selected for the physical features that each individual passenger sees in the respective PFOV, which can be through different windows of the autonomous vehicle facing different directions in the environment. In an embodiment, the personal preferences of each passenger are combined to generate content that is of interest to all the passengers in the autonomous vehicle. For example, if the passenger profiles indicate preferences for steak and for seafood restaurants, a listing of steak and seafood restaurants along with their respective menus, crowd-sourced user reviews, and business hours can be displayed to the passengers in the autonomous vehicle. In an embodiment, the passengers can use a voice command to call the restaurant to make a reservation and/or and the planning module of the autonomous vehicle can generate a trajectory to the restaurant from the current location of the autonomous vehicle.

In an embodiment, content is filtered based on passenger seat location. For example, passenger attention data and passenger preference data from passengers on the left-side of the autonomous vehicle can be given preference over data from passengers on the right-side of the vehicle or vice-versa. This could occur in situations where there are no physical features of interest in a particular side of the vehicle. For semi-autonomous vehicles that still require a driver, the "driver" seat can take priority over other passenger seat locations. For example, the "driver" seat can be held to a higher degree of importance than rear seats, because the passenger in the "driver" seat has more control or input over where the vehicle is headed.

In an embodiment, passenger identifying information and preferences are associated with seat assignments and used to select or filter content. For example, in a vehicle with 4 passenger seats the vehicle knows that Bob is in seat 1, Sue is in seat 2, Rob is seat 3 and Mary is in seat 4. With this knowledge multiple content streams can be created that are tailored to the personal preference of each passenger. Seat assignments also eliminate the need for face detection algorithms to identify the passengers in the vehicle. In some embodiments, however, sensors (e.g., image sensors) in the passenger compartment are used for face detection to identify each individual in the passenger compartment, and use that data to obtain their respective preference data from a database in the vehicle or personal passenger device, or from a database access through a network-based computing platform.

In an embodiment, content is generated/selected based on an attention time span of the passenger determined from the passenger attention data. For example, the passenger attention data is generated/selected if the attention time span spent by the passenger on the physical feature is more than N seconds (e.g., 10 seconds), as anything less than N seconds is be considered to be of little to no importance to the passenger. That is, temporally stable PFOVs are used to generate or select content. In an embodiment, the temporal stability is determined by counting or tracking physical features in the PFOV. For example, the passenger takes a passing glance at a museum, and instead pays attention for more than three seconds at a landmark across the street from the museum, so the processing circuit would select and send content based on the landmark and not the museum to the passenger.

In an embodiment, an action includes assisting a localization circuit to localize the autonomous vehicle based at least in part on the physical feature data (e.g., landmark localization). If external 3D sensors are available (e.g., LiDAR, RADAR), visual odometry can be used to localize the AV in addition to GNSS or in place of wireless network localization depending on the visibility of GNSS satellites, multipath signals (e.g., dense urban environments), etc. If 3D sensors are not available, then landmark localization can be implemented using PFOV data and principles of geometry.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors, transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., Wi-Fi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data is stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
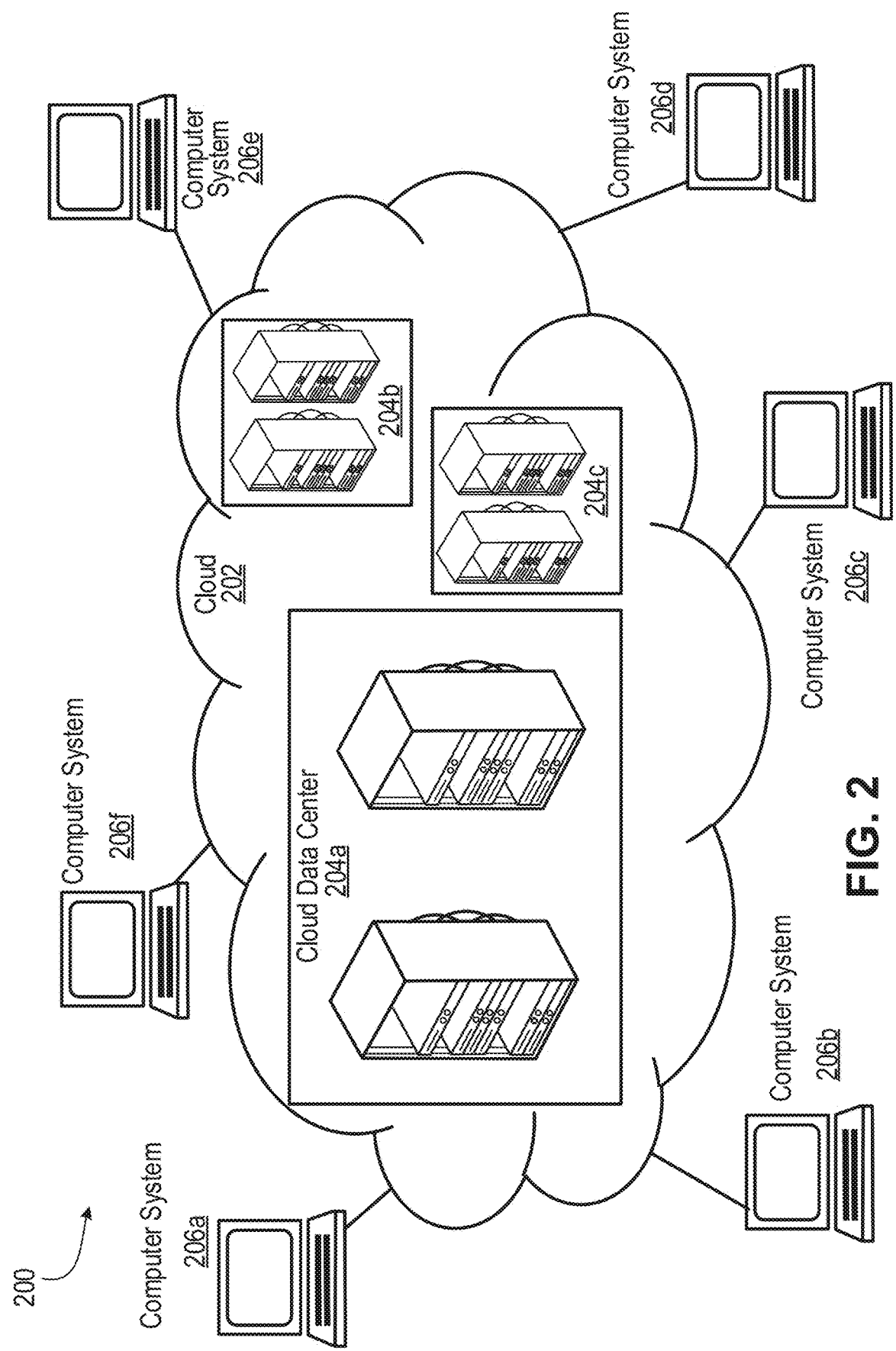
FIG. 2 illustrates an example "cloud" computing environment, in accordance with an embodiment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
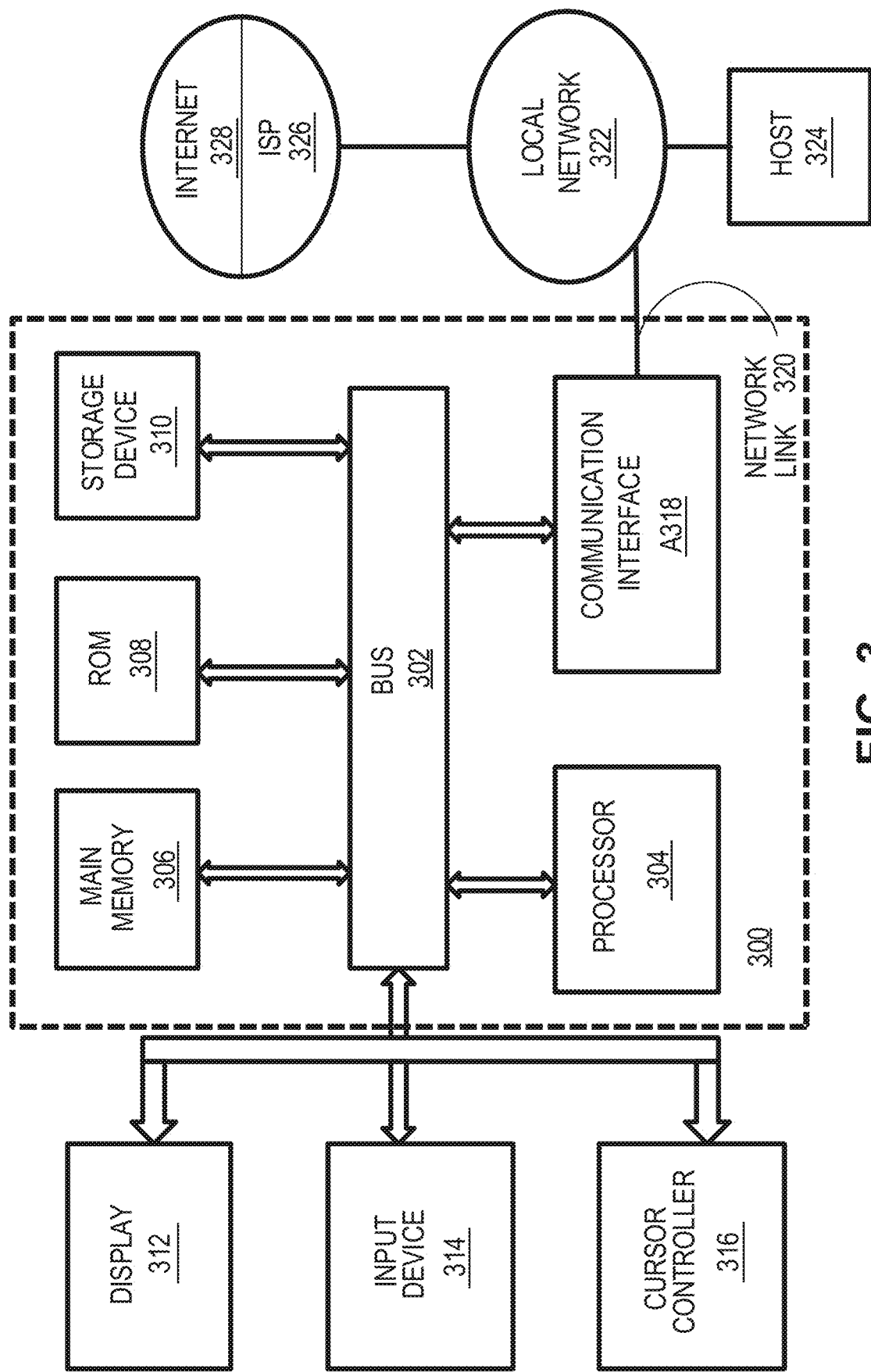
FIG. 3 illustrates a computer system, in accordance with an embodiment.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
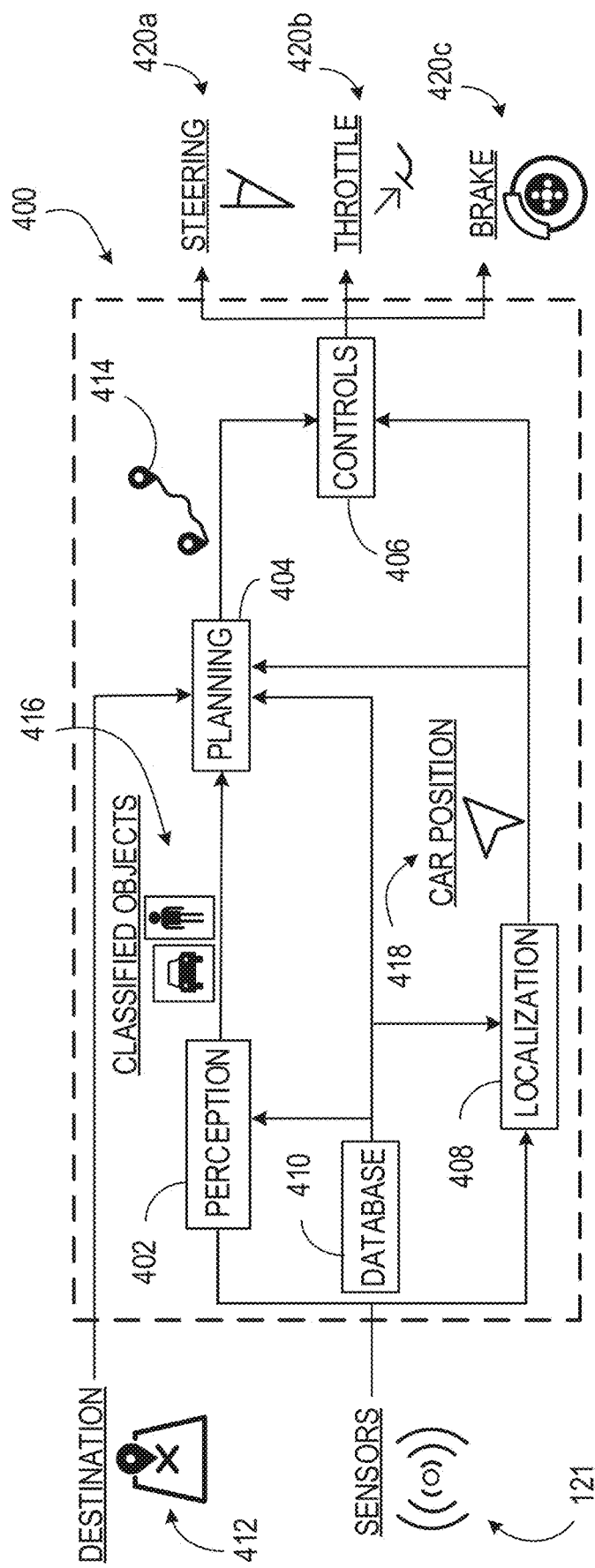
FIG. 4 shows an example architecture for an autonomous vehicle, in accordance with an embodiment.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
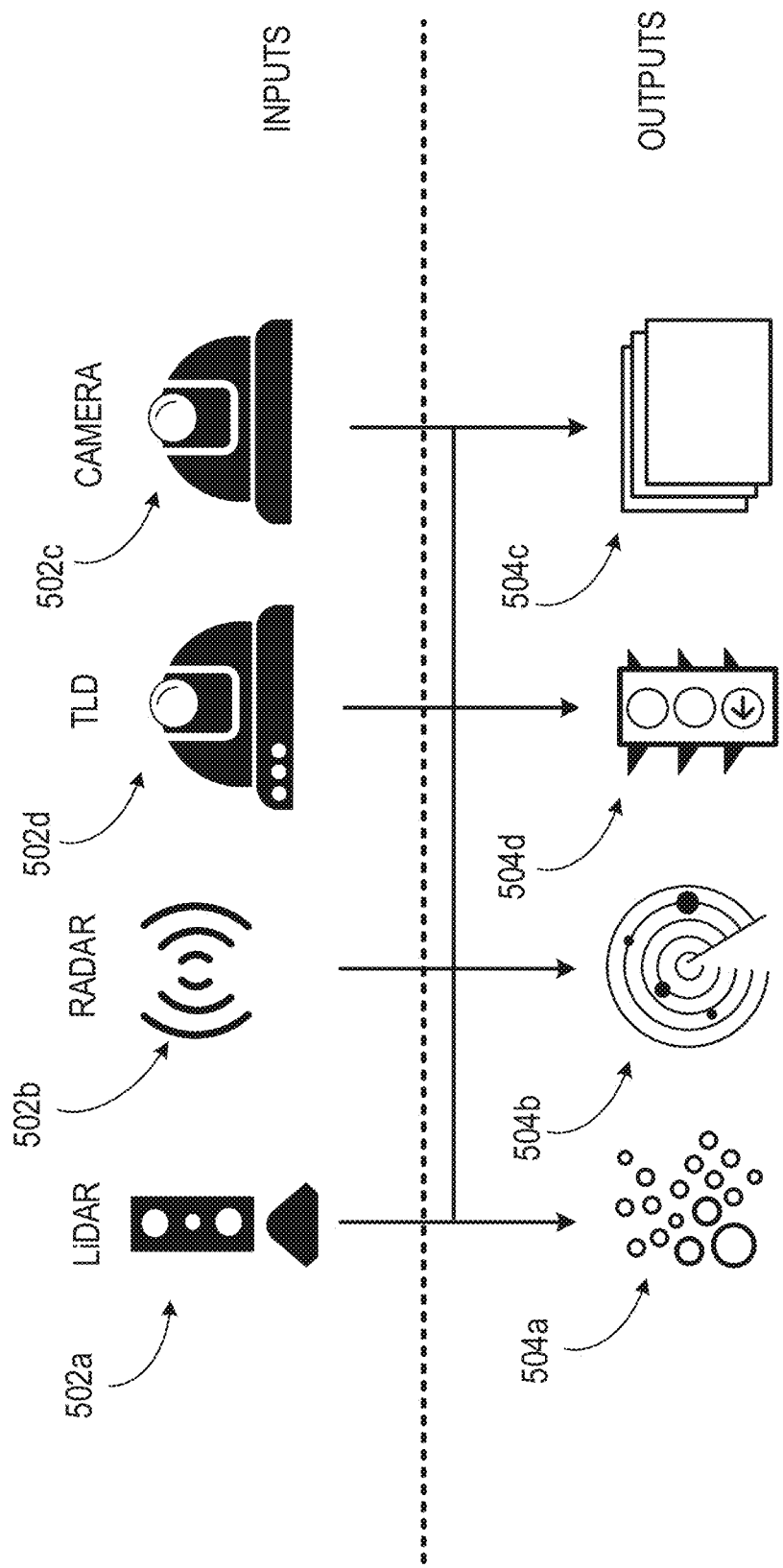
FIG. 5 shows an example of inputs and outputs that may be used by a perception module, in accordance with an embodiment.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
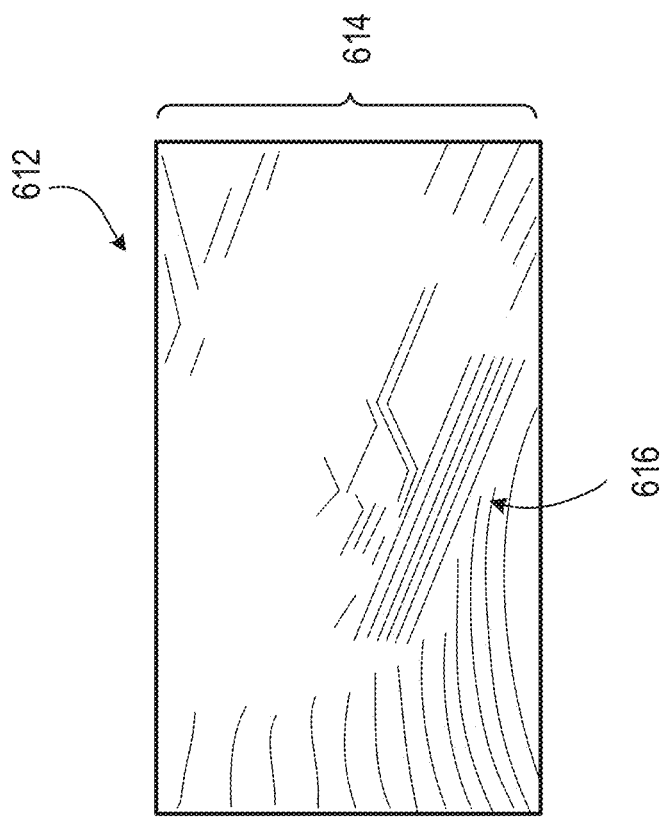
FIG. 6 shows an example of a LiDAR system, in accordance with an embodiment.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
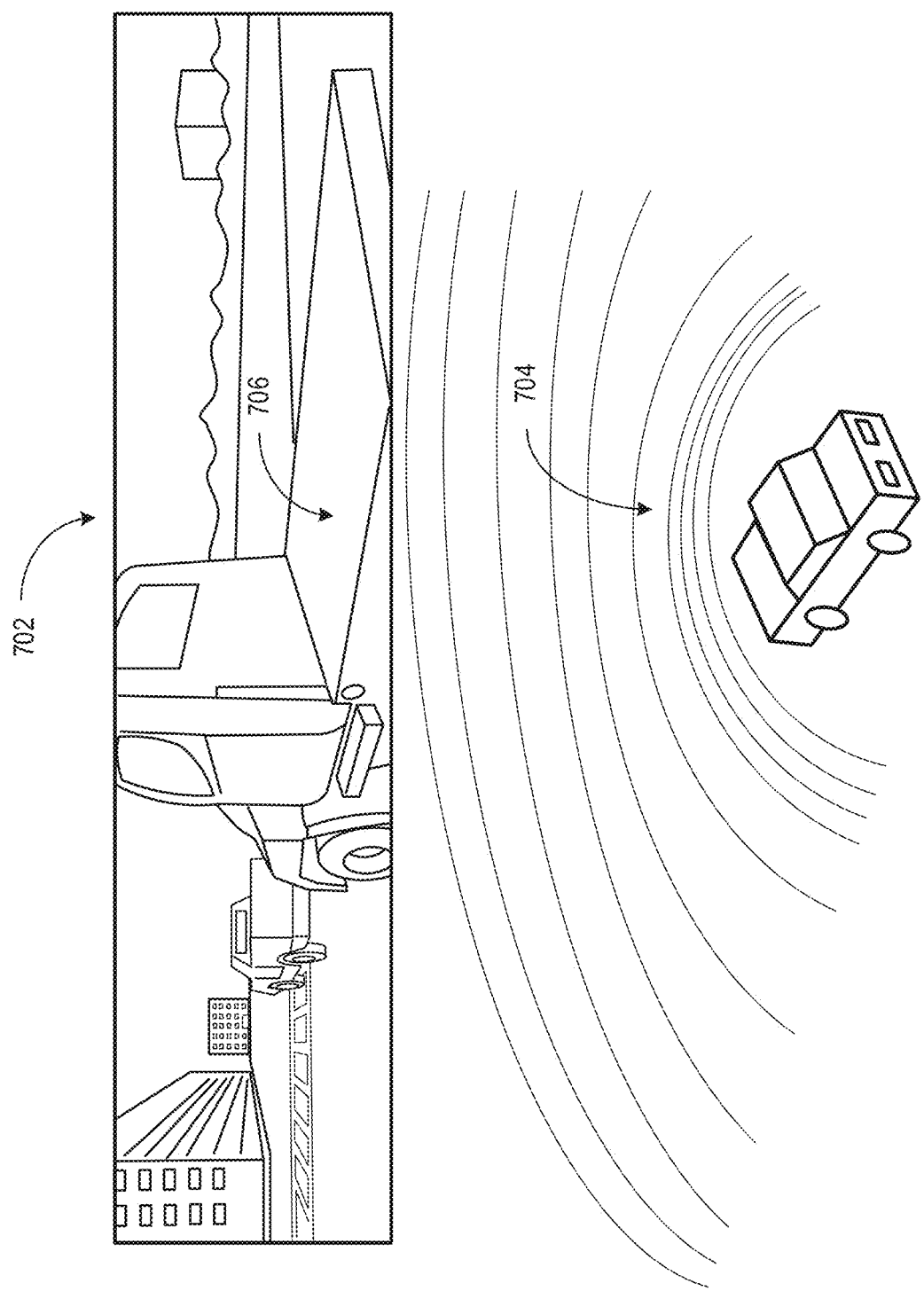
FIG. 7 shows the LiDAR system in operation, in accordance with an embodiment.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
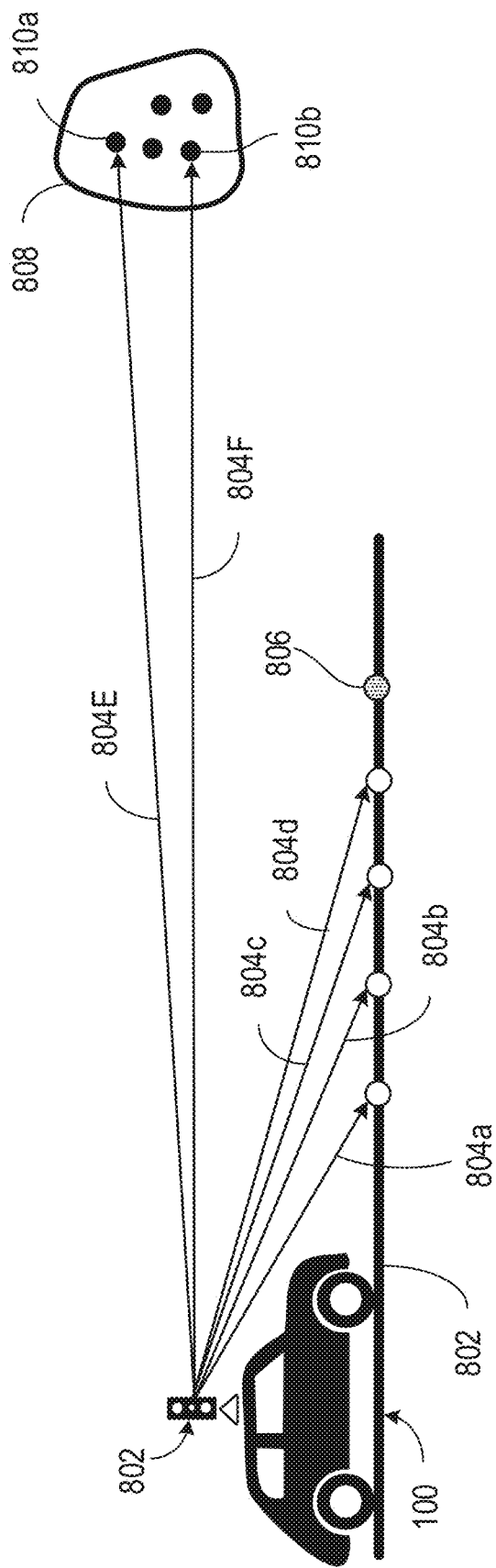
FIG. 8 shows the operation of the LiDAR system in additional detail, in accordance with an embodiment.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
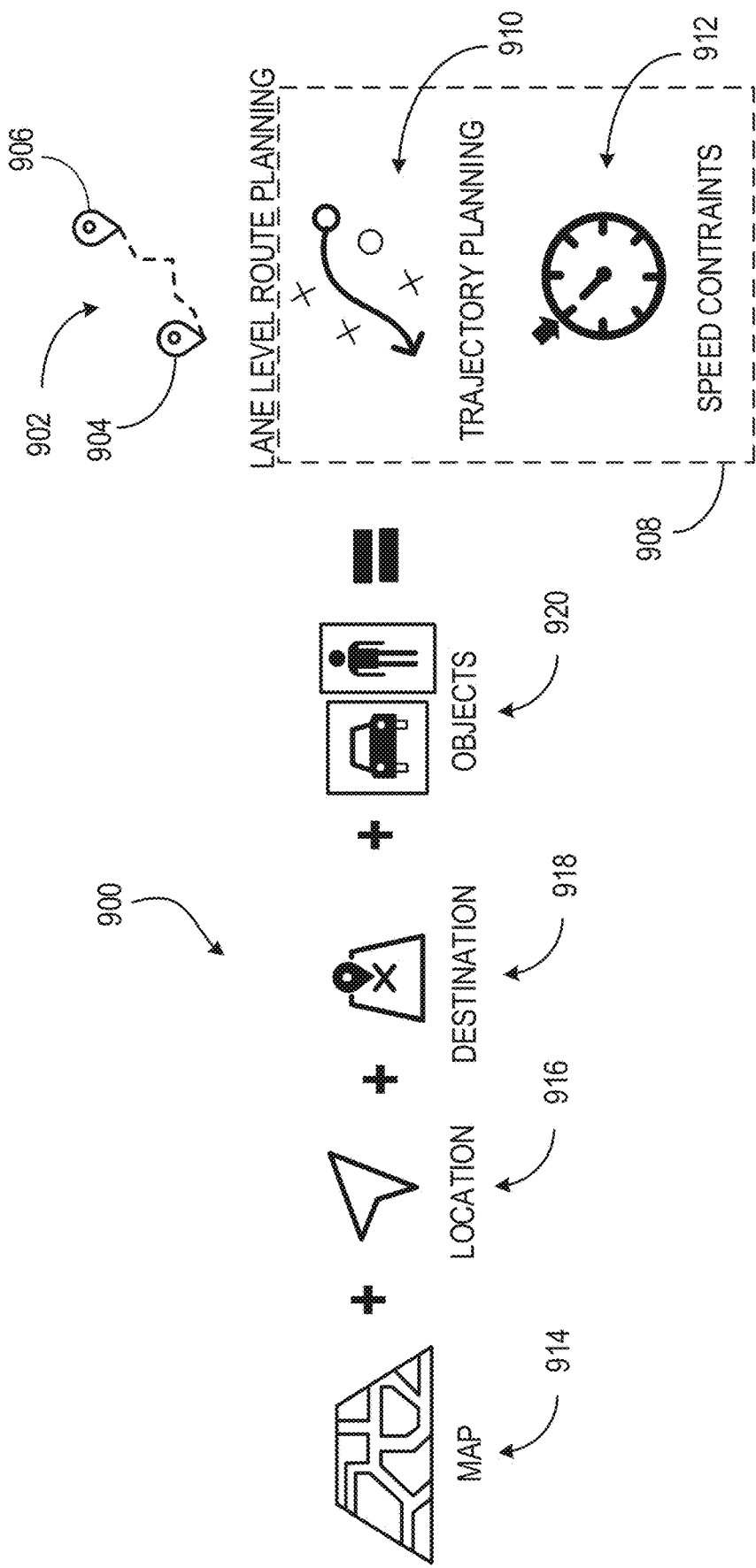
FIG. 9 shows a block diagram of the relationships between inputs and outputs of a planning module, in accordance with an embodiment.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
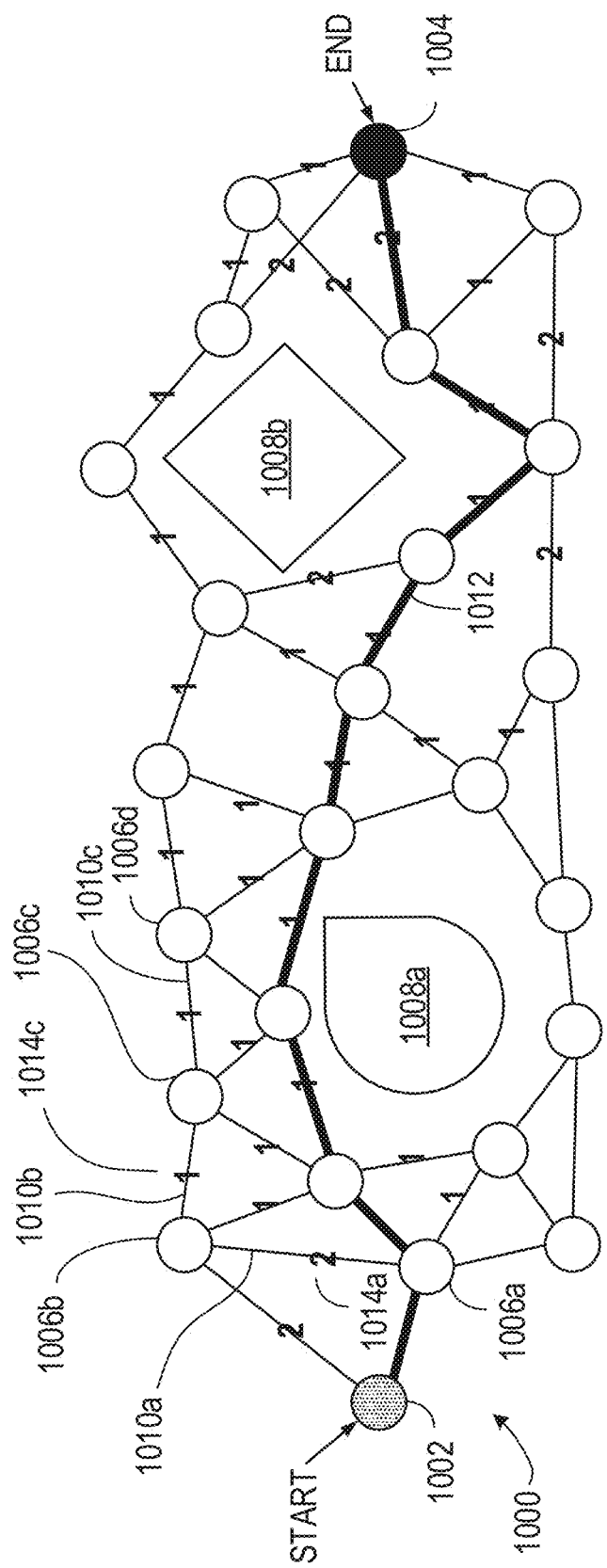
FIG. 10 shows a directed graph used in path planning, in accordance with an embodiment.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
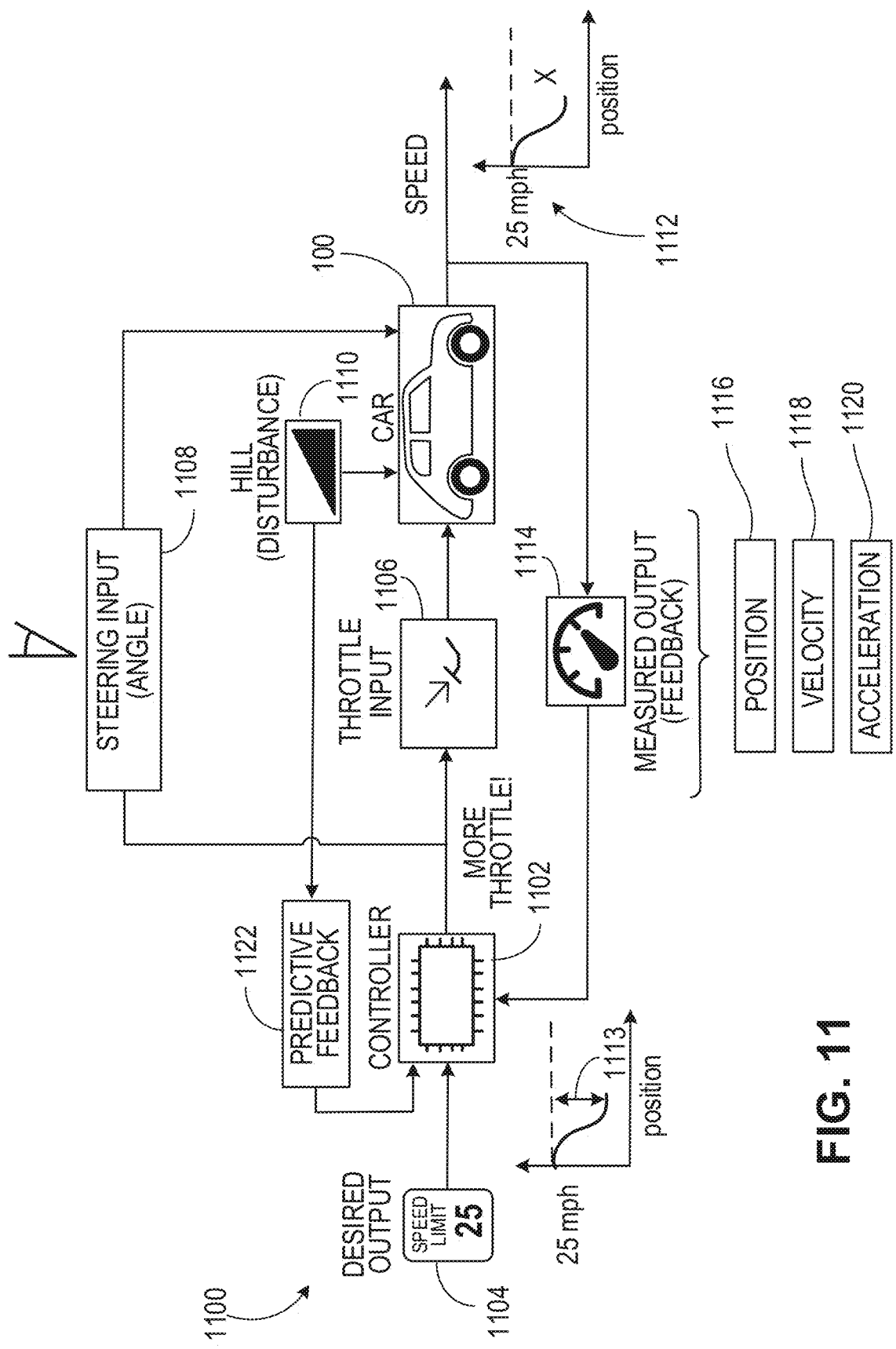
FIG. 11 shows a block diagram of the inputs and outputs of a control module, in accordance with an embodiment.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
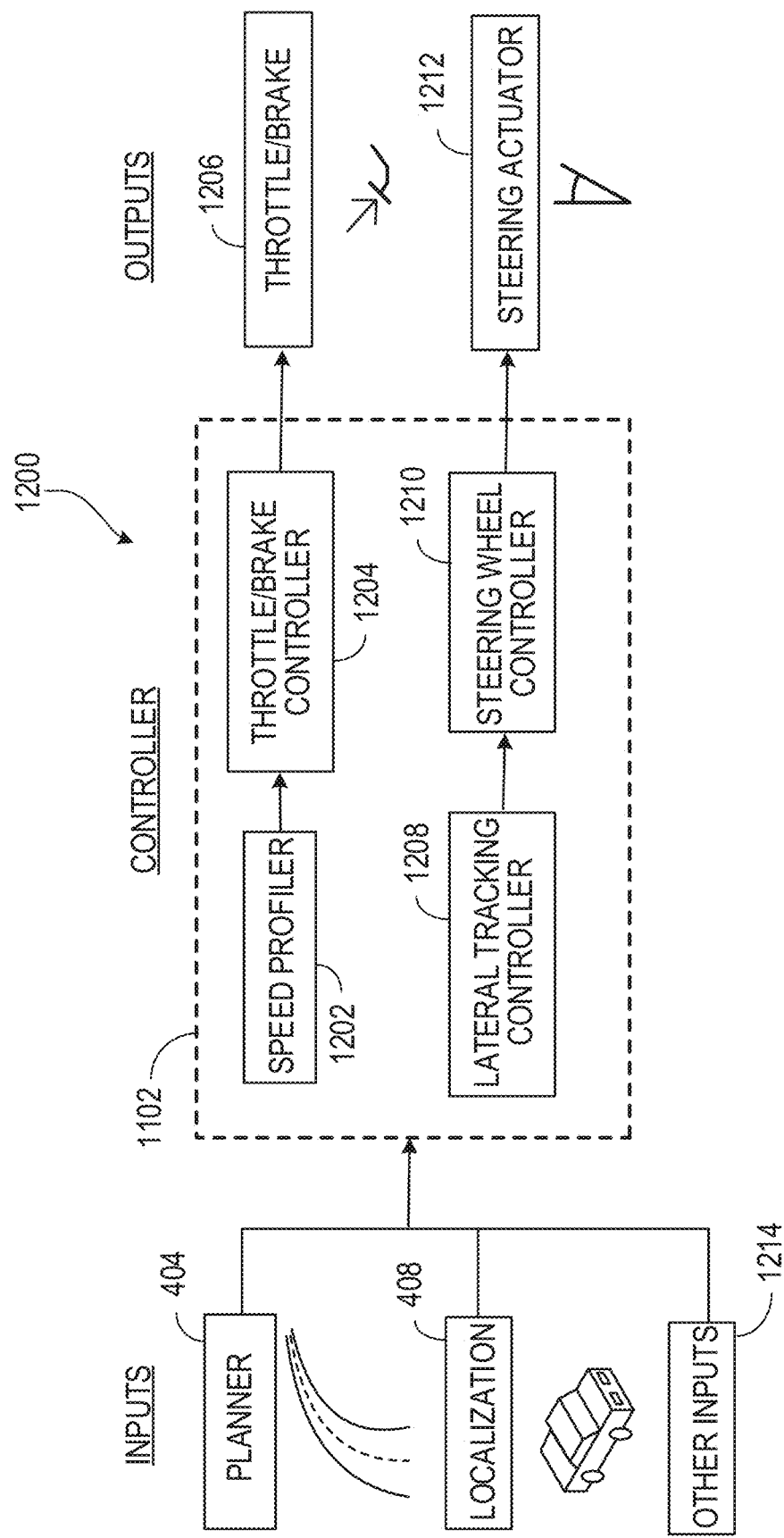
FIG. 12 shows a block diagram of the inputs, outputs, and components of a controller, in accordance with an embodiment.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Content Delivery Using Passenger Attention Data

Figure 13:
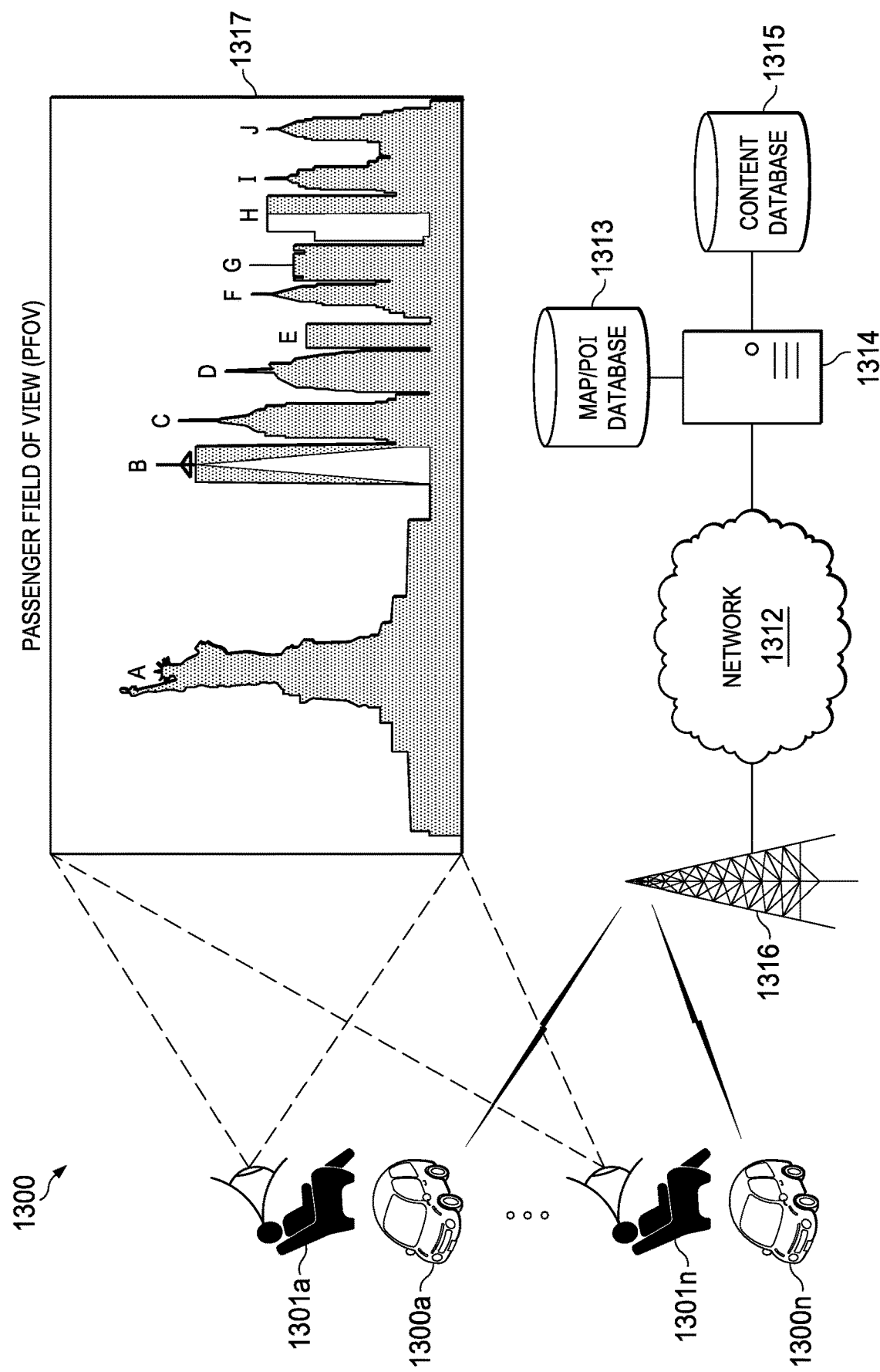
FIG. 13 is an example passenger attention system, in accordance with an embodiment.

FIG. 13 illustrates a passenger attention system 1300 in accordance with an embodiment. System 1300 includes a plurality of AVs 1300*a* . . . 1300*n*, each having at least one passenger 1301*a*-1301*n*, a network 1312, a map/POI database 1313, a server 1314, a content database 1315 and an access point (AP) 1316. In an embodiment, wireless transceivers on the AVs 1300*a* . . . 1300*n* communicate with server 1314 through AP 1316 (e.g., cell tower, Wi-Fi access point, Bluetooth transmitter, etc.). The network 1312 can be the Internet, a cellular mobile communications network, a radio wireless area network, and/or satellite internet. The server 1314 can be a tower server, a rack server in a server room and/or a blade server. The server 1314 can be multiple servers in a distributed network. The map database 1313 contains 2D and/or 3D digital maps, 3D building models and POIs (e.g., landmarks, businesses, government buildings, monuments, parks and any other physical feature that a passenger of an AV may be interested in). The content database 1315 contains passenger preference data and physical feature data, such as business information (e.g., business name, address, business hours, customer reviews), geographic location of physical features (e.g., latitude, longitude, altitude), passenger profiles including passenger preference data, various media related to physical features (e.g., images, video, slideshows, audio), advertisements, and physical feature data crowdsourced or otherwise obtained from passengers of the AVs 1300*a* . . . 1300*n*.

In the example shown, at least one passenger 1301*a* . . . 1301*n* in each vehicle 1300*a* . . . 1300*n* is looking out of a window of the AV. Each passenger 1301*a* . . . 1301*n* has their own viewing frustrum or perspective projection that defines a PFOV that includes one or more physical features, such as physical features A-J shown in the example PFOV 1317. The passenger's viewing frustrum and therefore the PFOV is determined from a passenger LOS vector that extends from the seated position of the passenger in the direction of a particular physical feature or cluster of physical features (e.g., directed to a centroid of the cluster). In an embodiment, an unobstructed passenger viewing frustrum will span around 210 degrees of horizontal vision and around 150 degrees of vertical vision. Accordingly, each passenger 1301*a*-1301*n* has their own PFOV that includes one or more physical features that the passenger sees in their viewing frustrum at the current location of the AV 1300*a*-1300*n*. The size of the PFOV may be limited by size of the window frame and/or other physical obstructions. In an embodiment, multiple passengers look out of the same window or share the same window frame and have independent viewing frustums.

In an embodiment, one or more sensors are included in the passenger compartments of the AV 1300*a* . . . 1300*n* that are used to capture passenger attention data. Some examples of sensors include 3D image sensors that capture image and depth, infrared sensors, eyeball movement and tracking sensors. The sensors are coupled to a processing circuit (e.g., an ASIC in the sensor or a separate computer) that use the image and depth data to determine the eye gaze direction and/or head/torso pose of the passenger relative to a local reference coordinate system. The head/torso pose (e.g., angle orientation of the head and/or torso of the passenger), known physical layout of the AV (e.g., location of seats and windows) and the location and heading of the AV can be used together to determine the passenger LOS vector in the local reference coordinate system.

Once determined, the passenger LOS vector is used to determine the physical feature(s) included in the PFOV. For example, the head/torso pose can be defined by yaw and pitch angles in a local reference coordinate system centered at the AV's center of gravity or the seat position of the passenger. The yaw and pitch angles are used to construct the passenger LOS vector in the local reference coordinate system. A coordinate transformation can then be used to transform the passenger LOS vector into a geodetic coordinate system or local level coordinate system that is used to define the environment of digital map or model data, such as a North West Up (NWU) reference coordinate system. The passenger LOS in the local level reference coordinate system is used with a 2D/3D digital map and/or 3D building model stored in database 1313 to determine one or more physical features in the PFOV. In some cases, the LOS vector is further transformed so that the vector is in the same reference coordinate system as the digital map or building model data. In an embodiment, a ray tracing technique can be used to determine the physical features, if any, in the environment that intersect with the passenger LOS vector or fall within a specified angular distance around the LOS vector and/or if any portion of the PFOV is obstructed.

After the one or more physical features in the PFOV are identified, physical feature data associated with the identified physical feature(s) is retrieved from the content database 1315 or aggregated into new content tailored to the passenger based on the passenger's preference data stored in a passenger profile in content database 1315. In response to a request from the passenger, the content is delivered to the AV and/or to a personal device the passenger (e.g., a smartphone, tablet computer, wearable device), as described in reference to FIG. 14. In an embodiment, physical feature data associated with the identified physical feature is generated in real-time from various online resources. In an embodiment, the content is delivered to display devices or heads up display units built into the AV's side windows/viewports or front or back windshields/windscreens.

In an embodiment, passenger attention data includes an audio recording of commentary or utterance about a physical feature made by the passenger 1301*a* . . . 1301*n*. For example, among a number of physical features in the PFOV 1317 (features A-J), the passenger's attention can be focused on a particular physical feature, such as the Statue of Liberty (feature A), because the passenger's commentary (or another passenger's commentary) indicates that the passenger's attention is on the Statue of Liberty. For example, the passenger 1301a says "look at the Statue of Liberty," which provides a cue that the passenger's attention is focused on the Statue of Liberty rather than one of the other features in the PFOV 1317 (features B-J). In an embodiment, the audio recording is sampled and processed by a speech recognition engine to identify key words that can be mapped to a physical feature description in map/POI database 1313. In an embodiment, passengers are asked to "opt-in" verbally through a microphone or through a touch display before being recorded to safeguard their privacy.

In an embodiment, determining the physical feature includes determining a location of the AVs 1300a . . . 1300n in the environment using localization circuits in the AVs. For example, the AV 1300a can localized using one or more of GNSS position estimates, cell tower triangulation, or wireless network localization (e.g., Wi-Fi methods). In an embodiment, the velocity of the AV 1300a is used to determine when a particular PFOV has changed or about to change due to motion of the AV relative to the physical feature. For example, as the AV 1300a moves physical features will enter and leave the PFOV. Depending on a predicted rate of change of the PFOV, the data rate for the sensors and for sending and receiving communications to the server 1314 can be adjusted to ensure that currently relevant content is delivered to the passenger while the corresponding physical features are still in the PFOV. Additionally, the amount of content delivered and/or aggregated can be adjusted to ensure relevant content is delivered in a timely manner.

In an embodiment, passenger attention data obtained from passengers 1301a-1301n riding in AVs 1300a . . . 1300n can be used to augment the physical feature data in the map/POI database 1313 and content in the content database 1315. For example, physical feature data such as an unmapped scenic spot that is popular with many passengers can be added to the digital map of the environment, and can become a suggested stopping place for future passengers traveling at the same location.

In an embodiment, the PFOV data is used together with other information to generate or select content for delivery to the passenger. For example, the season, weather conditions (e.g., from a wireless weather forecast service), the time of day, user preferences and demographics (e.g., provided by the passenger after opt-in), passenger musical tastes (e.g., derived from the vehicle's infotainment system), the departure and destination locations and chosen route (e.g., provided by the navigation system), and any other information that is available or can be derived to generate and/or select targeted content for passengers.

In an embodiment, content includes audio-visual information about the physical feature in a PFOV, virtual reality (VR) or augmented reality (AR) information, including tours, and 3D views, related to the physical features, and advertisements related to businesses located at or around or near the physical feature. In an embodiment, the PFOV, VR, or AR content includes interactive games that can be played by the passenger. In an embodiment, the interactive games are displayed to the passengers if the PFOV data indicates that the passenger is no longer observing the physical feature or looking outside the vehicle.

In an embodiment, content includes themed VR and AR representations of currently observed environment or physical feature as determined from the PFOV of a passenger. In an embodiment, the themed AR and VR representation is projected onto the display devices built into the windows or windshields of the AV. For example, the themed VR and AR representations can include a steampunk theme, a western or American frontier theme, or a science fiction theme, among others. The themed representations can also include representations of the environment recorded on a clear sunny day, representations from a time of day when the physical feature appears 'striking' or 'beautiful,' or representations from other vantage points that enhance the viewing experience of the passenger. In an embodiment, themed representations are used to enhance the passenger's viewing experience during environmental conditions when the physical feature is not clearly visible, for example, during bad weather such as fog, smog, snow, sleet, rain etc., time of day, temporary obstructions, or presence of too many tourists.

In an embodiment, when there are multiple physical features in a PFOV that have been identified as of interest to the passenger, the identified physical features are filtered according to the passenger's previously specified or learned preferences. For example, the passenger may have a user profile that indicates a preference for content related to historical landmarks. This preference would be used to filter out identified physical features. The physical features of the environment can include but are not limited to: landmarks, buildings, natural geographic sites, scenic lookouts, restaurants, rest stops, or anything else that can attract a passenger's attention. In an implementation, the physical feature is temporary, such as a traffic accident, road conditions (e.g., large pot holes), or damaged roadway infrastructure (e.g., signs, traffic lights, bridges) that can be identified from PFOV data and verified by the passenger. In an embodiment, the verified PFOV is used to alert first responders or other government services, if necessary.

In an embodiment, content sent to passengers is presented on or played through a suitable output device in the autonomous vehicle. For example, the autonomous vehicle can display the content on a heads-up display, on a screen (e.g., a touchscreen) or play the content through loudspeakers in the autonomous vehicle. The content can also send be sent to a passenger mobile device (e.g., a smartphone, tablet computer, wearable device) through a mobile Wi-Fi router in the autonomous vehicle or through a cellular network connection.

In an embodiment where there are two or more passengers in the autonomous vehicle, passenger preference data is obtained for each passenger. Separate content can be generated or selected for the physical features that each individual passenger sees in the respective PFOV, which can be through different windows of the autonomous vehicle facing different directions in the environment. The personal preferences of each passenger can be combined to generate content that is of interest to all the passengers in the autonomous vehicle. For example, if the passenger profiles indicate preferences for steak and for seafood restaurants, a listing of steak and seafood restaurants along with their respective menus, crowdsourced user reviews, and business hours can be displayed to the passengers in the autonomous vehicle. In an embodiment, the passengers can use a voice command to call the restaurant to make a reservation and/or and the planning module of the autonomous vehicle can generate a trajectory to the restaurant from the current location of the autonomous vehicle.

In an embodiment, content is filtered based on passenger seat location. For example, passenger attention data and passenger preference data from passengers on the left-side of the autonomous vehicle can be given preference over data from passengers on the right-side of the vehicle or vice-versa. This could occur in situations where there are no physical features of interest in a particular side of the vehicle. For semi-autonomous vehicles that still require a driver, the "driver" seat can take priority over other passenger seat locations. For example, the "driver" seat can be held to a higher degree of importance than rear seats, because the passenger in the "driver" seat has more control or input over where the semi-autonomous vehicle is headed.

In an embodiment, passenger identifying information and preferences are associated with seat assignments and used to select or filter content. For example, in a vehicle with 4 passenger seats the vehicle knows that Bob is in seat 1, Sue is in seat 2, Rob is seat 3 and Mary is in seat 4. With this knowledge multiple content streams can be created that are tailored to the personal preference of each passenger. Seat assignments also eliminate the need for face detection algorithms to identify the passengers in the vehicle. In some embodiments, however, sensors (e.g., image sensors) in the passenger compartment are used for face detection to identify each individual in the passenger compartment, and use that data to obtain their respective preference data from a database in the vehicle or personal passenger device, or from a database access through a network-based computing platform.

In an embodiment, content is generated/selected based on an attention time span of the passenger determined from the passenger attention data. For example, the passenger attention data will only be considered if the attention time span spent by the passenger on the physical feature is more than N seconds (e.g., 10 seconds), as anything less than N seconds is be considered to be of little to no importance to the passenger. That is, only temporally stable PFOVs are used to generate or select content. In an embodiment, the temporal stability is determined by counting or tracking physical features in the PFOV. For example, the passenger only takes a passing glance at a museum, and instead pays attention for more than three seconds at the landmark across the street from the museum. In this scenario, the processing circuit would select and send content based on the landmark and not the museum to the passenger.

Figure 14:
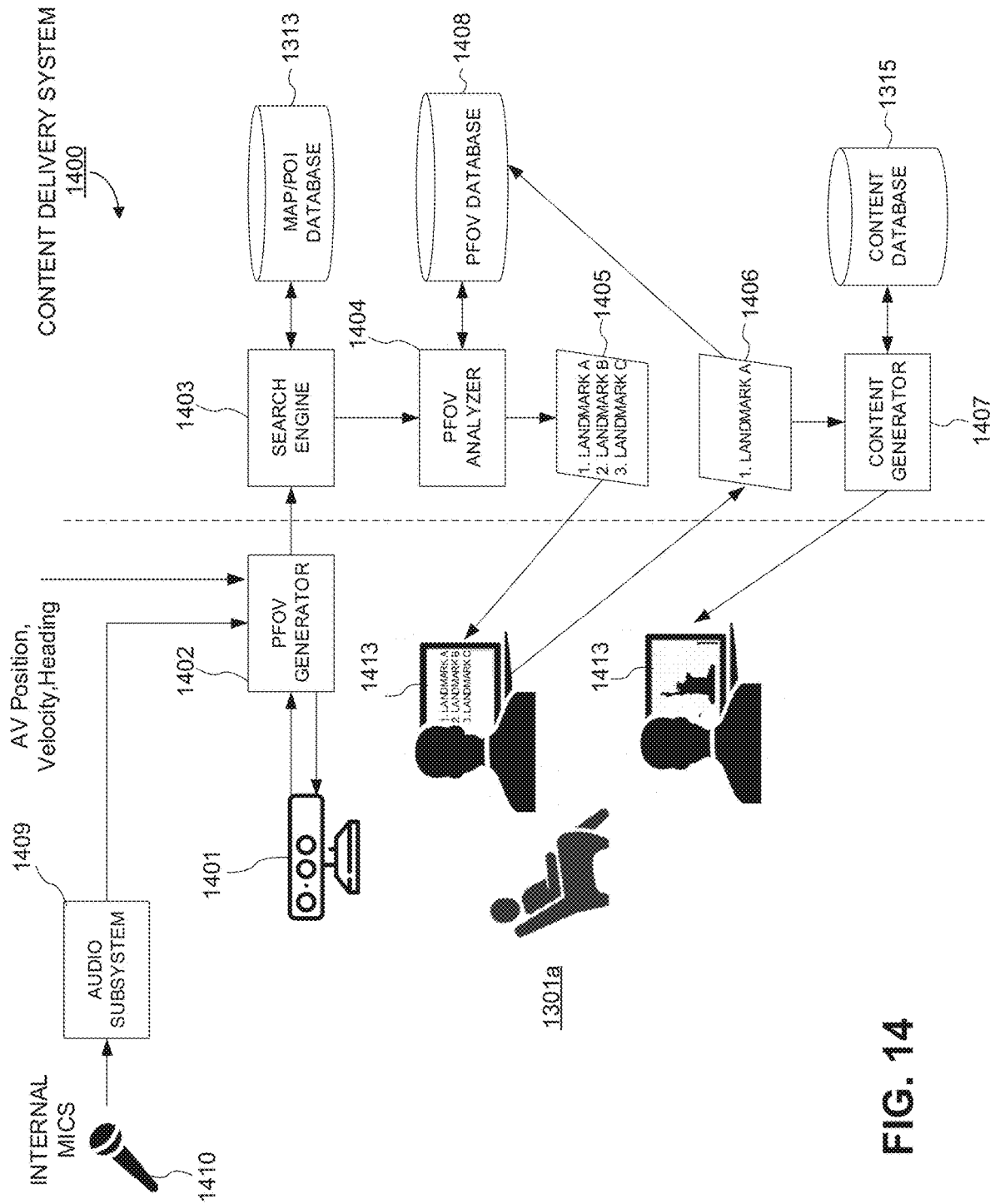
FIG. 14 is a block diagram illustrating a content delivery system that uses passenger attention data to select/generate content for delivery to an autonomous vehicle, in accordance with an embodiment.

FIG. 14 is a block diagram illustrating a content delivery system 1400 based on passenger attention data, in accordance with an embodiment. System 1400 includes AV 1300a, passenger 1301a, map/POI database 1313, content database 1315, internal and external sensors 1401, PFOV generator 1402, search engine 1403, PFOV analyzer 1404, content generator 1407, PFOV database 1408, audio subsystem 1409, internal microphones 1410 (e.g., a microphone array), and an output device of the AV 1413. The dashed line in FIG. 14 separates the client side of the system 1400 (to the left of the dashed line) and the server side of the system 1400 (to the right of the dashed line). The AV 1300a, the passenger 1301a, the map database 1313, and the content database 1315 were previously described in reference to FIG. 13.

Referring to the client side of system 1400, one or more internal sensors 1401, which may include image sensors, eyeball tracking sensors, and infrared scanners, among others, capture passenger data of one or more passengers 1301a in a passenger compartment of AV 1300a. The internal sensors 1401 can be 3D image sensors, such as stereo video cameras. The captured passenger data is processed by a processing circuit to generate eye gaze direction data and/or head/torso pose data, which is collectively referred to as passenger attention data. The passenger attention data is input into PFOV generator 1402. In an embodiment, audio commentary/utterances by passengers 1301a in AV 1300a are captured by one or more microphones 1410 in the passenger compartment and processed by audio subsystem 1409. Audio subsystem 1409 includes an audio amplifier and circuitry to filter and convert analog audio signals into audio samples. The audio samples are input into PFOV generator 1402.

The PFOV generator 1402 uses the head/torso pose (e.g., angle orientation of the head and/or torso of the passenger in a local reference coordinate system), the known physical layout of the AV (e.g., location of seats and windows) and the location and heading of the AV together to determine the LOS vector from the passenger to the environment in the local reference coordinate system. For example, the head/torso pose defined by yaw and pitch in a local reference coordinate system define the passenger LOS vector in the local reference coordinate system. A coordinate transformation than transforms the passenger LOS vector into local level coordinate system, such as the NWU reference coordinate system. The passenger LOS vector in the local level reference coordinate system is used with a 2D/3D digital map and/or 3D building model (e.g., obtained from database 1313) to determine one or more physical features in the PFOV. In some cases, the LOS vector will need to be transformed again to be in the same reference coordinate system as the 2D/3D digital map or 3D building model. In an embodiment, ray tracing is used by the PFOV generator 1402 to determine which physical features in the environment intersect with the passenger LOS vector or fall within a specified angular distance around the LOS vector, and whether any portion of the PFOV is physically obstructed.

In an embodiment, the PFOV generator 1402 provides feedback to an external gimbaled sensor 1401 that can be steered in the direction of the passenger LOS vector. For example, the boresight of the external sensor 1401 can be aligned with the passenger LOS vector, so that the FOV of the sensor 1401 is coextensive with the PFOV. The external sensor 1401 can then capture an image that is a proxy for the PFOV. The captured image can be used with machine learning and an image databased to determine the physical features in the PFOV.

The mathematically constructed PFOV and/or the proxy PFOV image captured by the external sensor 1401 described above are sent to a network-based computing platform for further processing. In an embodiment, the PFOV generator 1402 is implemented on the network-based computing platform rather than the AV 100, or on both the AV 100 and the network-based computer platform. If implemented on the network-based computing platform, the raw sensor data, the AV location and heading and any audio samples are transmitted to the network-based computing platform through a wireless communication link (e.g., cellular, Wi-Fi), as described in reference to FIG. 13.

Referring to the server side of system 1400, the search engine 1403 uses the PFOV to retrieve physical feature data for the identified physical features in the PFOV. If a proxy image is received, the search engine 1403 can do an image search for matching images of the physical features using a machine learning algorithm or other pattern matching technology. If raw sensor data is received, search engine 1403 can perform the same mathematical functions as PFOV generator 1402 described above.

The physical feature data is the sent into PFOV analyzer module 1404 which is coupled to PFOV database 1408. The PFOV analyzer module 1404 stores crowd-sourced PFOV data harvested at the location from a plurality of AVs to generate a data structure 1405 that identifies physical feature(s) (e.g., a list) together with the physical feature data, such as the name and address of the physical feature(s) and a summary description of the physical feature(s). In an embodiment, the physical feature(s) in the data structure 1405 is ordered according to popularity of the physical feature as determined by the crowd-sourced PFOV data in PFOV database 1408, and/or can be filtered based on the personal preferences of one or more passengers in the AV 1300a. For example, PFOV database 1408 can maintain a frequency of content requests from AV passengers at the location for a particular physical feature and then use the frequency as a measure of popularity. The data structure 1405 can include the most popular physical feature(s) at a more prominent location or font in the data structure 1405 and provide recommendations, reviews, etc.

The data structure 1405 is transmitted to the AV 1300a where it is displayed on an AV output device 1413 (e.g., a computer display screen in the AV) and/or a personal passenger device (e.g., smart phone, tablet computer, wearable device). At the AV 1300a, the passenger 1301a is asked to select one or more of the physical features for which they want to receive content. For example, the passenger 1301a can be prompted to check a box, press a button or otherwise indicate through a touchscreen or through speech query to request the content. In the example shown, the passenger 1301a selected to receive content for Landmark A (the Statue of Liberty). The passenger response is sent in a data structure 1406 to the network-based computing platform where it is stored in the PFOV database 1408 and also input into content generator 1407.

Content generator 1407 retrieves content related to the physical feature(s) selected by the passenger 1301a, and sends the content to the AV 1300a where the content is played (e.g., video, A/V, audio only) or otherwise presented by output device 1413 (e.g., a computer display). In an embodiment, content generator 1407 aggregates content and creates new content (e.g., a personalized video or slideshow) from the aggregated content that is tailored to the physical feature data and the passenger preference data if available.

Localization Using Passenger Attention Data

Figure 15:
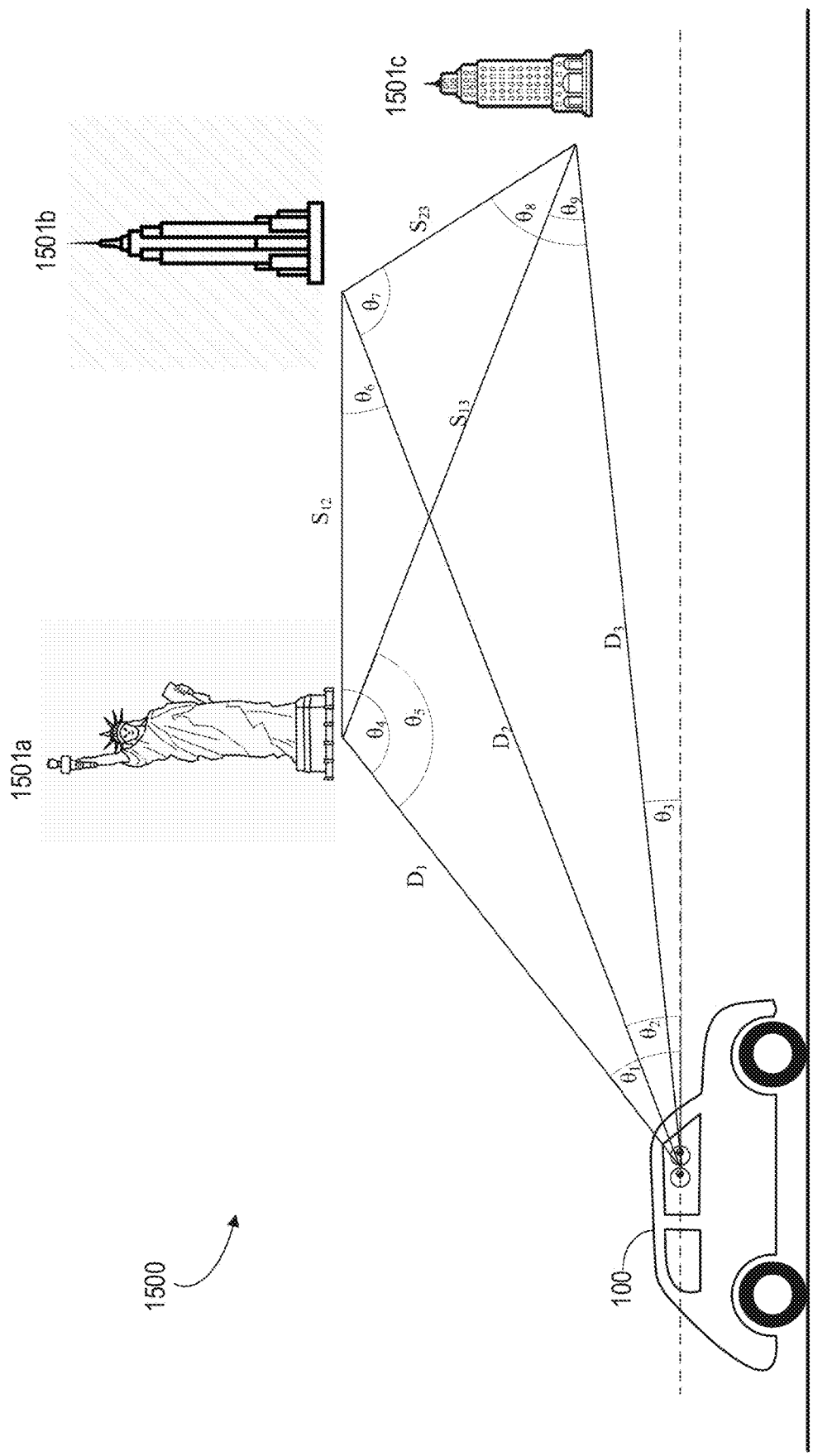
FIG. 15 is a diagram illustrating a localization system that uses passenger attention data to assist in localizing an autonomous vehicle, in accordance with an embodiment.

FIG. 15 is a diagram illustrating a localization system 1500, in accordance with an embodiment. AV localization typically uses GNSS or wireless network transmitters for localization (e.g., cellular, Wi-Fi). In some instances, however, GNSS and wireless networks may not be available for localization. If 3D sensors are available to capture the PFOV (including depth/distance data), the captured images and depth/distance data are used to localize the AV using known techniques, such trilateration or visual odometry. If image and depth/distance data are not available, then passenger LOS vectors directed to landmarks, and the known locations of the landmarks, are used to assist in localizing the AV using localization system 1500.

The system 1500 includes an AV 100, a first physical feature of the environment 1501a, a second physical feature of the environment 1501b, a third physical feature of the environment 1501c, a first LOS vector originating at the AV 100 and ending at the first physical feature 1501a an angle $\theta_1$ from an eye level, a second LOS vector originating at the AV 100 and ending at the second physical feature 1501b an angle $\theta_2$ from an eye level, a third LOS vector originating at the AV 100 and ending at the third physical feature 1501c an angle $\theta_3$ from an eye level, a distance $D_1$ from the AV 100 to the first physical feature 1501a, a distance $D_2$ from the AV 100 to the second physical feature 1501b, a distance $D_3$ from the AV 100 to the third physical feature 1501c, a distance $S_{12}$ between the first physical feature 1501a and the second physical feature 1501b, a distance $S_{23}$ between the second physical feature 1501b and the third physical feature 1501c, a distance $S_{13}$ between the first physical feature 1501a and the third physical feature 1501c, an angle $\theta_4$ between $D_1$ and $S_{12}$, an angle $\theta_5$ between $D_1$ and $S_{13}$, an angle $\theta_6$ between $S_{12}$ and $D_2$, an angle $\theta_7$ between $D_2$ and $S_{23}$, an angle $\theta_8$ between $S_{23}$ and $S_{13}$, an angle $\theta_9$ between $D_3$ and $S_{13}$.

In an embodiment, a triangle with sides $D_1$, $D_2$, and $S_{12}$ is defined with angles $(\theta_1-\theta_2)$, $\theta_5$, and $\theta_6$. A triangle with sides $D_2$, $D_3$, and $S_{23}$ is defined with angles $(\theta_2-\theta_3)$, $\theta_7$, and $\theta_8$. A triangle with sides $D_1$, $D_3$, and $S_{13}$ is defined with angles $(\theta_1-\theta_3)$, $\theta_5$, and $\theta_9$.

In an embodiment, the position coordinates of the first physical feature 1501a, the second physical feature 1502b, and the third physical feature 1501c are obtained from their physical feature data. For example, the physical feature data includes the position coordinates obtained from a database (e.g., content database 1315 and/or map database 1313). In an embodiment, the distances $S_{12}$, $S_{23}$, and $S_{13}$ are calculated as the distance between the position coordinates of the first, second, and third physical features 1501a, 1501b, and 1501c. The distances $S_{12}$, $S_{23}$, and $S_{13}$ and angles $\theta_4$, $\theta_5$, $\theta_6$, $\theta_7$, $\theta_8$, and $\theta_9$ are obtained from a digital map.

In an embodiment, the angles $\theta_1$, $\theta_2$ and $\theta_3$ are measured using the first, second and third LOS vectors, which are determined as described in reference to FIGS. 13 and 14. The distances $D_1$, $D_2$, and $D_3$ are determined using the Law of Sines, given by equations [1]-[3]:

$$\frac{D_1}{\sin(\theta_6)} = \frac{D_2}{\sin(\theta_4)} = \frac{S_{12}}{\sin(\theta_1 - \theta_2)}, \qquad [1]$$

$$\frac{D_2}{\sin(\theta_8)} = \frac{D_3}{\sin(\theta_7)} = \frac{S_{23}}{\sin(\theta_2 - \theta_3)}, \qquad [2]$$

$$\frac{D_1}{\sin(\theta_9)} = \frac{D_3}{\sin(\theta_5)} = \frac{S_{13}}{\sin(\theta_1 - \theta_3)}, \qquad [3]$$

where a system of nine equations with 9 unknowns variables ($D_1$, $D_2$, $D_3$, $\theta_4$, $\theta_5$, $\theta_6$, $\theta_7$, $\theta_8$, and $\theta_9$) is solved to find $D_1$, $D_2$, and $D_3$. Once the distances $D_1$, $D_2$, and $D_3$ are determined, trilateration is used to localize the AV 100. It is important to note that at least a course estimate of the AV location is needed to determine the LOS vectors in the PFOV. In an embodiment, the course AV location estimate is obtained from inertial data (e.g., accelerometer and gyro data) and dead reckoning algorithms, or by matching images captured by external AV cameras images in database.

In an alternative embodiment, localization of the AV 100 using passenger LOS vectors is implemented as described in, Margrit Betke et al., "Mobile Robot Localization Using Landmarks." IEEE Transactions on Robotics and Automation 13(2):251-263 (May 1997), which publication is incorporated by reference herein in its entirety.

Figure 16:
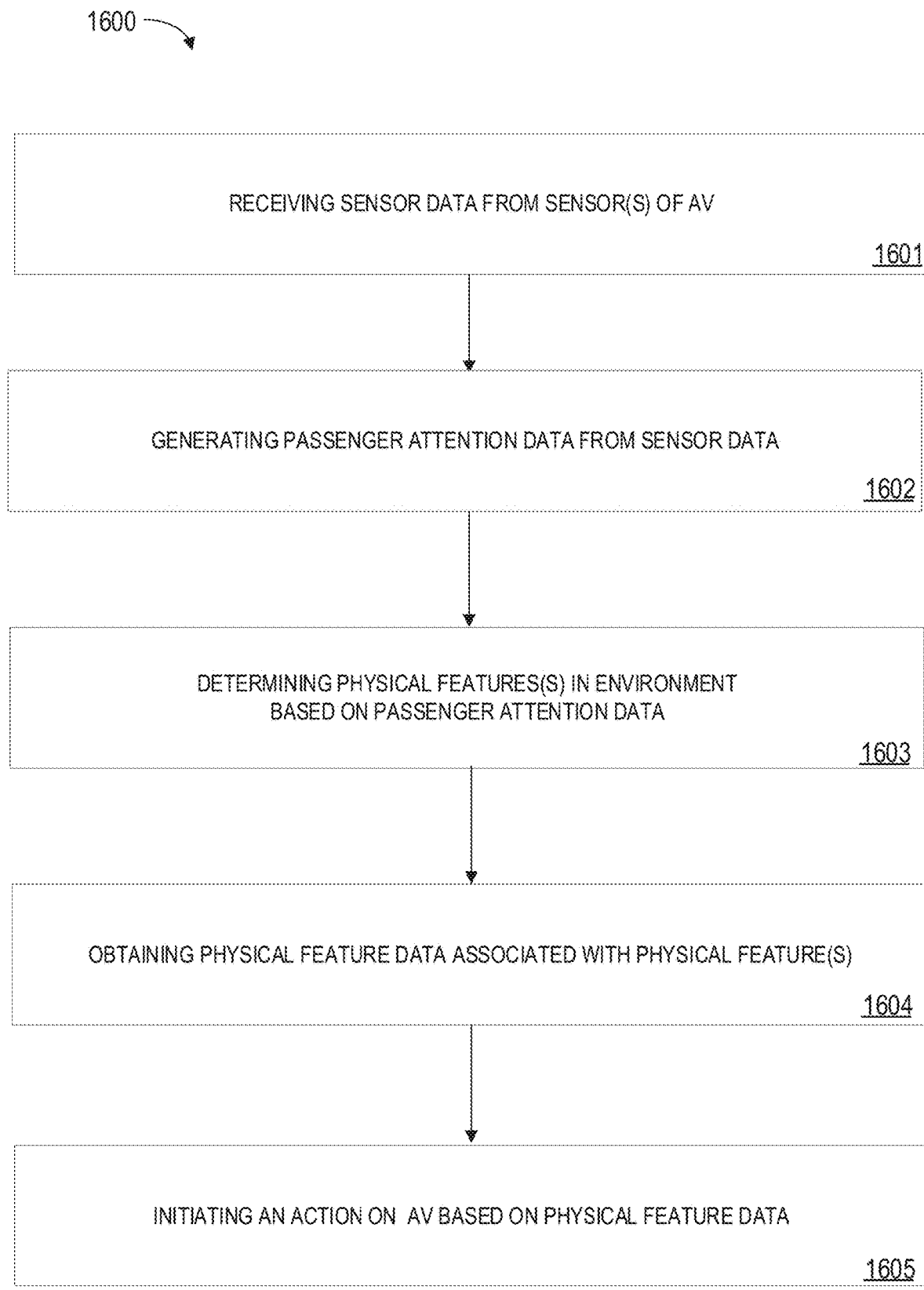
FIG. 16 is a flow diagram of a process of using passenger attention data for content delivery and localization, in accordance with an embodiment.

FIG. 16 is a flow diagram of a process 1600 of using passenger attention data for content delivery and/or localization, in accordance with an embodiment. Process 1600 can be implemented using, for example, the content delivery and localization systems 1400, 1500, described in reference to FIGS. 14 and 15, respectively.

Process 1600 begins by receiving, from one or more sensors of an autonomous vehicle (AV) operating in an environment, sensor data (1601), and generating passenger attention data from the sensor data for a passenger of the AV (1602). For example, one or more 3D image sensors in the passenger compartment of an AV can generate images that are analyzed by a processing circuit to detect eye gaze direction and/or head/torso pose. The eye gaze direction and/or head/torso pose can be used to generate a passenger LOS vector in a local reference coordinate system fixed to the AV.

Process 1600 continues by determining, using a processing circuit, a physical feature of the environment based on the passenger attention data in the environment (1603). For example, the passenger LOS vector is transformed into a reference local-level coordinate system of a 2D/3D digital map or 3D building model, and a PFOV is generated around the passenger LOS vector. Using the 2D/3D digital map or 3D building model, one or more physical features (e.g., landmarks, buildings, monuments, bridges, museums, scene overlooks, natural formations) are determined to fall with the PFOV. In an embodiment the physical features are filtered based on passenger preferences, seat position in the AV and an attention span, as described in reference to FIGS. 13 and 14.

Process 1600 continues by obtaining, using the processing circuit, physical feature data (1604). For example, physical feature data can be collected from a database (e.g., a map/POI database 1313, content database 1315) for each physical feature in the PFOV.

Process 1600 continues by initiating, using the processing circuit of the AV, an action on the AV based at least in part on the physical feature data (1605). For example, passengers in the AV can each be asked to select from a list of physical features from which the passenger desires to receive content. The content can be aggregated and filtered based on the individual passenger preferences and seat assignment. In embodiment, personalized content (e.g., a virtual tour media, slideshow, audio tour) is created for each passenger in the AV from the physical feature data associated with their individual PFOV. For example, each passenger can be looking out a different window in the AV and in a different direction. Thus, each passenger PFOV can include different physical features. In an embodiment, an action is augmenting a digital map or model with the physical feature data or content (e.g., for a new POI).

In an embodiment, the AV is localized using passenger attention data (e.g., LOS vectors and PFOVs) and physical feature data (e.g., position coordinates) for three or more physical features. Using geometry principals (e.g., law of sines), distances from the AV to each of the physical features are computed and trilateration is used to improve or correct the position estimate of the AV.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   receiving sensor data from one or more sensors of an autonomous vehicle (AV) operating in an environment;
   generating, using a processing circuit, passenger attention data based on the sensor data;
   determining, using the processing circuit, a known location of at least one physical feature in the environment based on the passenger attention data;
   determining, using the processing circuit, a location of the AV based at least in part on the determined known location of the at least one physical feature and the passenger attention data; and
   initiating, using the processing circuit, an action on the AV based at least in part on the determined location of the AV.

2. The method of claim 1, wherein the action comprises:
   generating, using the processing circuit, physical feature data based on the at least one physical feature;
   obtaining, using the processing circuit, passenger preference data;
   selecting, using the processing circuit, content based on the physical feature data and the passenger preference data; and
   sending, using the processing circuit, the content to the AV for playback on an output device of the AV.

3. The method of claim 2, wherein the action comprises:
   sending, using the processing circuit, the content to a passenger mobile device in the AV.

4. The method of claim 2, wherein the content is an advertisement associated with the physical feature.

5. The method of claim 2, wherein the content is provided as virtual reality or augmented reality.

6. The method of claim 5, wherein the virtual reality or augmented reality content comprises themed representations.

7. The method of claim 1, wherein the sensor data includes image data indicating a direction in which the passenger is looking.

8. The method of claim 7, wherein the AV is occupied by two or more passengers and the action comprises:
   receiving, using the processing circuit, first passenger preference data from a first passenger in the AV and second passenger preference data from a second passenger in the AV;
   selecting, using the processing circuit, content related to the physical feature based on the first passenger preference data and second passenger preference data; and
   sending, using the processing circuit, the content to the AV or a passenger mobile device in the AV.

9. The method of claim 8, further comprising:
   determining, using the processing circuit, seat locations of the first passenger and the second passenger in the AV; and
   filtering, using the processing circuit, at least one of the passenger attention data or content based on the seat locations.

10. The method of claim 1, wherein the passenger attention data includes audio samples of commentary or utterances made by the passenger in the AV that is indicative of the physical feature.

11. The method of claim 1, wherein determining a known location of at least one physical feature, further comprises:
    determining, using the processing circuit, a location of the AV in the environment;
    determining, from the sensor data, a passenger line-of-sight (LOS) vector that extends from the location of the AV in a direction of the physical feature; and determining, using the processing circuit, the physical feature using the passenger line-of-sight vector and a three-dimensional (3D) map or model of the environment.

12. The method of claim 1, wherein the action comprises:
generating, using the processing circuit, physical feature data based on the at least one physical feature;
generating or obtaining, using the processing circuit, content related to the physical feature data; and
augmenting, using the processing circuit, a digital map of the environment to include the content.

13. The method of claim 12, wherein the content is virtual tour media that includes at least a portion of the physical feature data.

14. The method of claim 1, further comprising:
determining, using the processing circuit, an attention time span of the passenger based on the passenger attention data; and
filtering, using the processing circuit, the passenger attention data based on the attention time span.

15. A non-transitory, computer-readable storage medium having instructions stored thereon, that when executed by one or more processors, cause the one or more processors to perform operations comprising:
receiving, from one or more sensors of an autonomous vehicle (AV) operating in an environment, sensor data;
generating, using a processing circuit, passenger attention data based on the sensor data;
determining, using the processing circuit, at least one physical feature in the environment based on the passenger attention data;
obtaining, using the processing circuit, a known location of the at least one physical feature;
determining, using a localization circuit or the processing circuit, a location of the AV based at least in part on the determined known location of the at least one physical feature and the passenger attention data; and
initiating, using the processing circuit of the AV, an action on the AV based at least in part on the determined location of the AV.

16. An autonomous vehicle (AV), comprising:
one or more sensors; and
a processor circuit operable to:
receive, from the one or more sensors, sensor data;
generate, using the sensor data, passenger attention data;
determine at least one a physical feature in an environment of the AV based on the passenger attention data;
obtain a known location of the at least one physical feature;
determine a location of the AV based at least in part on the determined known location of the at least one physical feature and the passenger attention data; and
a controller circuit configured to initiate an action on the AV based at least in part on the determined location of the AV.

17. The method of claim 1, comprising: obtaining, from at least one sensor of the vehicle's cabin, sensor data indicating a passenger's pose or look direction.

18. The method of claim 1, wherein the at least one sensor comprises at least one camera, and the sensor data comprises image data.

19. The method of claim 3, wherein the passenger mobile device is used to display the content.

20. The method of claim 1, wherein the location of the AV is determined using the Law of Sines and trilateration based on passenger line-of-sight (LOS) vectors.

21. The method of claim 1, wherein the passenger attention data comprises a distance and direction from the passenger to the at least one physical feature.

22. The method of claim 21, wherein the passenger attention data comprises at least one passenger line-of-sight (LOS) vector.

* * * * *